United States Patent [19]
Catto

[11] 3,968,941
[45] July 13, 1976

[54] INTERBIASED DOUBLE TAPE SPOOL ASSEMBLY

[75] Inventor: Kenneth A. Catto, Beaverton, Oreg.
[73] Assignee: Telephonax, Inc., Portland, Oreg.
[22] Filed: Apr. 4, 1975
[21] Appl. No.: 565,203

[52] U.S. Cl. ............................... 242/193; 352/156
[51] Int. Cl.² ..................... G03B 1/04; G11B 15/32
[58] Field of Search ..................... 242/188–194, 242/107 R; 352/156; 360/93, 96

[56] References Cited
UNITED STATES PATENTS

| | | | |
|---|---|---|---|
| 2,996,264 | 8/1961 | Bygdnes | 242/193 |
| 3,679,215 | 7/1972 | Roberts et al. | 242/193 X |
| 3,684,208 | 8/1972 | Larsen | 242/188 |

*Primary Examiner*—Leonard D. Christian
*Attorney, Agent, or Firm*—Kolisch, Hartwell, Dickinson & Stuart

[57] ABSTRACT

A tape spool assembly for handling magnetic recording tape, or the like, including a pair of coaxial spools interbiased for counterrotation. The biasing means used for the spools features a pair of spirally wound springs, and a floating rotatable plate disposed between the spools and connected thereto by the springs—this plate being rotatable relative to both spools on the same common axis.

10 Claims, 3 Drawing Figures

INTERBIASED DOUBLE TAPE SPOOL ASSEMBLY

BACKGROUND AND SUMMARY OF THE INVENTION

This invention pertains to a tape spool assembly, and more particularly to a coaxial, interbiased, two-spool assembly for handling magnetic recording tape, or the like. For the purpose of illustration herein, a preferred embodiment of the invention is described in conjunction with a tape deck in a telephone answering device wherein the invention has been found to have particular utility.

There are many applications in which it is desired to utilize tape transport apparatus which is simple, reliable, and as compact as possible. For example, a modern telephone answering device of the type which might be used in a small office or in a home is one type of apparatus in which these characteristics are particularly desirable.

One technique which has been used in the past to approach these objectives is to use a stacked, or coaxial, double spool assembly for collecting the opposite end of the tape in the usual windings. With such an assembly, there is conventionally provided a single spirally wound biasing spring, such as a clock spring, one end of which acts directly on one of the spools, and the other end of which acts directly on the other spool, tending to produce counterrotation between the spools. The purpose of such a spring is to maintain tension in the reach of tape which extends between the spools (along guide means and adjacent the usual recording, playback, and erase head), as well as to accommodate limited relative rotation between the spools to take care of differences in the diameters of windings on the spools as the tape is moved in reverse directions.

However, this type of construction has not been entirely satisfactory. To begin with, employing a single spring between spools does not, without seriously compromising overall compactness, permit use of a long enough spring to accommodate a relatively long run of tape on the spools. In other words, where long tape runs are desired (for example, a tape run accommodating perhaps up to about twenty minutes of recording), it is necessary to employ so long a spring, that the space required for this spring dictates the use of relatively sizable spools. A further problem is that where a single spring is used, this spring will be quite relaxed with most of the tape collected as windings on one of the spools, but will be extremely tense in the reverse situation where most of the tape is collected as windings on the other spool. As a consequence, as the tape is driven in reverse directions, tension in it varies extremely widely. This situation causes a number of very undesirable events. For example, it tends to produce inordinately high tape wear. Further, and particularly where the spring is especially tense, this produces considerable friction between the tape and the guide means for it, which friction can produce effects known as "wow" and "flutter."

A general object of the present invention is to provide a unique, interbiased, coaxial, double spool assembly which offers all of the features mentioned above as being desirable, while at the same time avoiding the several problems just discussed encountered with conventional interbiased spool assemblies.

According to a preferred embodiment of the invention, what is proposed is a tape spool assembly of the type just generally outlined, which includes a pair of coaxial spools that are interbiased for counterrotation by a pair of axially spaced, spirally wound biasing springs. Featured in the invention is a floating rotatable plate which is disposed between the spools, and is adapted for rotation relative to both spools and on the same common axis with the spools. The faces of the spools which confront this plate are provided with central cylindrical wells in which are disposed the two biasing springs. One of these springs acts between the spool containing it and one side of the floating plate, and the other spring acts between its associated spool and the opposite side of the floating plate.

With this construction, one gains the advantage of using a relatively long spring, and hence the ability to accommodate relatively long recording times, without the disadvantage of having to wind a single spring in a single compartment, with attendant compromise of compactness. Further, with the two springs which are used according to the invention mounted as just generally described, overall tension in that reach of tape which extends between the spools is maintained relatively constant. Thus, the wear and friction problems mentioned above are greatly minimized. In particular, tension in the springs, and hence in a tape, toward either limit of movement of the tape is greater than at intermediate positions. This is to be contrasted with the situation surrounding use of but a single spring which tenses toward one extreme of tape movement, and relaxes toward the opposite extreme.

These and other objects and advantages which are attained by the invention will become more fully apparent as the description which now follows is read in conjunction with the accompanying drawings.

Figure 1:
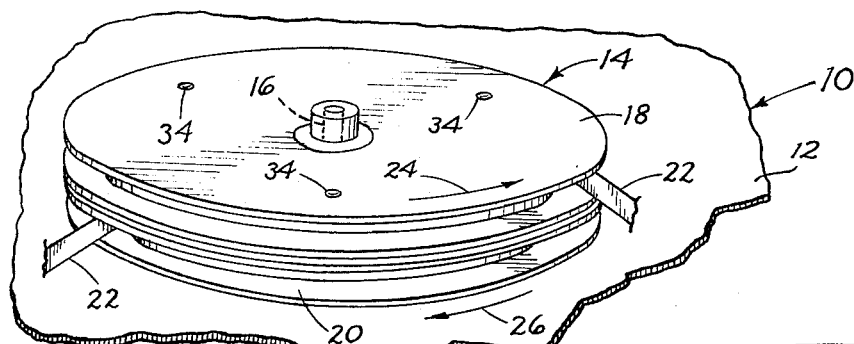
FIG. 1 is a fragmentary perspective view illustrating a portion of a tape transport apparatus in a telephone answering device utilizing a spool assembly constructed in accordance with the present invention.
Figure 3:
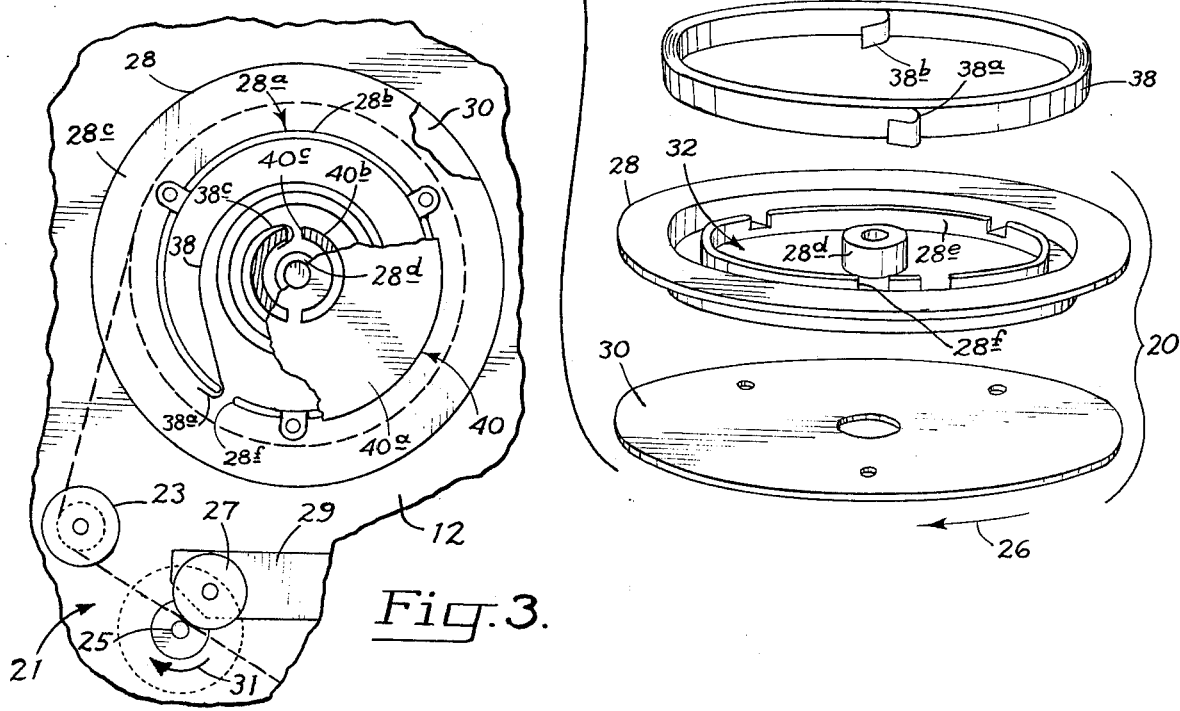

And, FIG. 3 is a reduced-scale view, taken generally along the rotational axis of the assembly of FIG. 1, and in the plane lying between the two spools in this assembly, and also showing other portions of the tape transport of FIG. 1.

DETAILED DESCRIPTION OF THE INVENTION

Turning now to the drawings, and referring first to FIG. 1, indicated generally at 10 is a portion of a tape transport apparatus in a telephone answering device, including a deck 12 upon which is rotatably mounted a spool assembly 14 which is constructed in accordance with the present invention. In particular, assembly 14 is suitably mounted for rotation on a spindle shown in dashed lines at 16.

In general terms, spool assembly 14 includes a pair of spools 18, 20 which are coaxial with each other, and which are interbiased for counterrotation in a manner which will be explained shortly. In FIG. 1, spool 18 is positioned above spool 20.

Spool assembly 14 is employed in apparatus 10 for taking up and paying out the opposite ends of an elongated magnetic recording tape which is shown fragmentarily at 22. It will be noted that the reference character 22 appears twice in FIG. 1, such being to indicate the opposite end portions of the tape which are collected as windings on spools 18, 20. Tape 22 extends from the spools in a reach which is guided by suitable guide means past the usual recording/erase/playback head. In other words, this reach is that portion of the tape which extends between the broken-off end portions of the tape shown in FIG. 1.

Considering, for a moment, FIG. 3, indicated generally at 21 is a portion of the guide and drive means provided in apparatus 10. Thus, shown at 23 is a guide roller which is mounted on deck 12, and at 25 is a drive shaft against which a bite of the tape is shown pinched by a rubber-tired pinch roller 27. Roller 27 is mounted on a shiftable carrier 29, which may be moved in any suitable manner to engage or disengage shaft 25. Shaft 25 is driven in the direction of arrow 31, and is intended, in cooperation with roller 27, to move the tape in a "forward" direction at a conventional voice-recording speed of about 33/4 inches-per-second. Reverse movement of the tape is accommodated by similar mechanism which is not shown. With driving of the tape in either direction, spools 18, 20 turn generally in a common direction, although at slightly different speeds as dictated by the relative diameters of tape windings on the spools.

The interbiasing (mentioned briefly above) which occurs between spools 18, 20 tends to produce rotation of spool 18 in the direction of arrow 24 relative to spool 20, and rotation of spool 20 in the direction of arrow 26 relative to spool 18. It will be noted that the end of tape 22 which is collected as windings on spool 18 extends from the right side of this spool in FIG. 1, whereas the end of the tape which is collected on spool 20 extends from the left side of this spool in FIG. 1. As a consequence of this situation, and of the tendency for counterrotation between the spools as indicated by arrows 24, 26, the interbiasing between the spools obviously tends to maintain tension in the tape.

Figure 2:
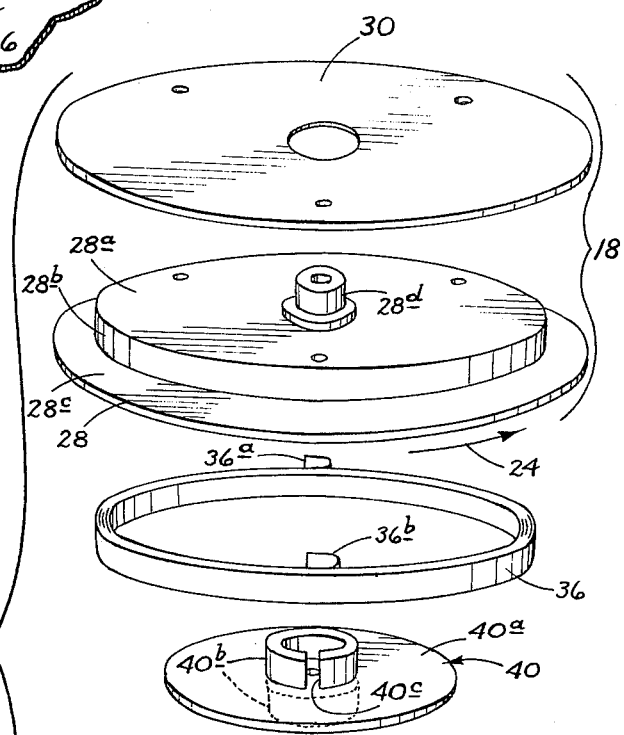
FIG. 2 is an exploded perspective view, on substantially the same scale as FIG. 1, illustrating details of construction of the assembly of FIG. 1.

Turning now to FIGS. 2 and 3, wherein constructional details of the assembly are more readily apparent, the two spools in the assembly are identical in construction, and, essentially, are disposed in the assembly in mirror-image coaxial confrontation. Thus, provided in each spool are what may be thought of as an inner part 28 and an outer part 30. Each of the inner spool parts includes a central generally cylindrical portion 28a, which is hollow on the side of the part which faces the other spool, and whose outer circumferential surface 28b functions to collect windings of tape. A flange 28c provides for side support for one side of a winding of tape on the spool. Projecting from the inner and outer sides of central portion 28a is a cylindrical bearing portion 28d which accommodates mounting of assembly 14 on a spindle, such as spindle 16.

Referring particularly to the inner spool part shown for spool 20 in FIGS. 2 and 3, formed on this part within the hollow interior of the central portion 28a is an axially projecting circular wall 28e which defines a generally cylindrical well 32, the use for which will be explained briefly. Wall 28e is provided with a notch 28f whose function will also be explained shortly.

The inner spool parts herein are preferably formed as unitary parts out of a suitable material such as a plastic material.

Outer spool parts 30 take the form herein of thin, circular, metallic discs which have central openings 30a that fit freely over the outwardly projecting parts of bearing portions 28d in parts 28. Parts 30 have an outside diameter which is substantially the same as that of flanges 28c. Means, such as rivets 34 shown in FIG. 1, secure parts 30 to parts 28.

Interbiasing as contemplated herein between spools 18, 20 is produced by a pair of spirally wound springs 36, 38 working in conjunction with a central floating plate 40. Plate 40 is a unitary member, including a thin central circular web 40a which projects as a flange from a pair of central axially projecting hollow cylindrical hub portions 40b. The outside diameter of portion 40a is about the same as the outside diameter of walls 28e in parts 28. The inside diameter of hub portions 40b is considerably larger than the outside diameter of bearing portions 28d.

Each hub portion 40b includes a notch, such as those shown at 40c in FIGS. 2 and 3. These two notches face in opposite radial directions.

Completing a description of what is shown in the drawings, the opposite ends of spring 36 are provided with reverse bends, or hooks, 36a, 36b. Similarly, the opposite ends of spring 38 are provided with reverse bends, or hooks, 38a, 38b. Hooks 36b, 38b define the inner ends of the springs, and hooks 36a, 38a define the outer ends of the springs. These two springs, with respect to the directions of their spiral windings, are disposed as indicated in FIG. 2. With the various parts in the overall spool assembly mounted together, springs 36, 38 are disposed within wells 32, with hooks 36a, 38a caught in notches 28f, and with hooks 36b, 38b caught in notches 40c of hub portions 40b which extend into the wells. Referring particularly to FIG. 3, spring 38 is seen so mounted in place between plate 40 and the inner part 28 of spool 20.

It will thus be apparent that with the various parts of the overall spool assembly all together, the two biasing springs, working in conjunction with floating plate 40, tend to produce counterrotation between the spools as indicated by arrows 24, 26. Plate 40 is disposed rotationally between the two spools, and tends to produce tension-equalization between the springs. With such construction, these two springs, without compromising compactness, can accommodate a relatively large amount of tape on the spools. Further, because of the combination of springs 36, 38 and plate 40, overall tension changes in the reach of tape extending between the spools, as the spools approach opposite limits of rotational movement, are greatly minimized. Hence, the problems of friction, "wow" and "flutter" are also greatly minimized.

It will be obvious to those skilled in the art that the exact shapes of the spools, and of the particular parts therein making them up, may be varied to suit different particular applications. Also, the floating plate used between the spools may take on different configurations if desired.

Thus, while a preferred embodiment of the invention has been described, it is appreciated that variations and modifications may be made without departing from the spirit of the invention.

It is claimed and desired to secure by letters patent:

1. A tape spool assembly for accommodating reversible movement of a magnetic recording tape, or the like, comprising
 a pair of spools for carrying such a tape mounted in side-by-side relation for rotation on a common axis, a plate positioned between said spools and mounted for rotation relative to both spools on the same common axis, and a pair of biasing means with one operatively interposed and acting between said plate and one of said spools tending to urge relative rotation therebetween in one direction, and with the other operatively interposed and acting between said plate and the other spool tending to urge relative rotation therebetween in the opposite direction.

2. The assembly of claim 1, wherein each of said biasing means comprises a spirally wound spring.

3. The assembly of claim 1, wherein one of said biasing means is positioned between one side of said plate and one of said spools, and the other biasing means is positioned between the other side of said plate and the other spool.

4. The assembly of claim 3, wherein each biasing means comprises a spirally wound spring.

5. A tape-carrying assembly for use in conjunction with a tape transport mechanism comprising a pair of tape spools mounted in side-by-side relation for rotation on a common axis, and means acting with substantially constant force between said spools tending to produce counterrotation therebetween, said means comprising a plate positioned between said spools and mounted for rotation relative to both spools on the same common axis, and a pair of biasing means with one operatively interposed and acting between said plate and one of said spools tending to urge relative rotation therebetween in one direction, and with the other operatively interposed and acting between said plate and the other spool tending to urge relative rotation therebetween in the opposite direction.

6. The assembly of claim 5, wherein each of said biasing means comprises a spirally wound spring.

7. The assembly of claim 5, wherein one of said biasing means is positioned between one side of said plate and one of said spools, and the other biasing means is positioned between the other side of said plate and the other spool.

8. The assembly of claim 7, wherein each biasing means comprises a spirally wound spring.

9. A coaxial, interbiased spool assembly for taking up and paying out a magnetic recording tape, or the like, comprising a pair of spools for carrying such tape positioned in side-by-side coaxial relation for relative rotation on a common axis, each of said spools including outer and inner sides, with means on the inner side of each spool defining a generally cylindrical open well which faces the well on the inner side of the other spool, a substantially circular plate disposed between said spools for rotation relative to both spools on the same common axis, said plate including an axially central web substantially completely spanning the confronting open sides of said wells, joined integrally with a pair of oppositely, axially projecting central hub portions each of which extends into one of said wells, and a pair of spirally wound biasing springs each disposed in a different one of said wells, with each biasing spring having one end attached to the associated spool and its opposite end attached to the associated hub portion of said plate, said biasing springs tending to urge relative rotation in opposite directions between said plate and said spools.

10. A tape spool assembly for storing opposite end windings of, and for accommodating limited reversible movement of, an elongated magnetic recording tape, or the like, comprising a pair of coaxial, relatively rotatable spools, mounted for rotation in a common direction with movement of a tape carried by the spools, and biasing means operatively interposed and acting between said spools for urging counterrotation therebetween, said biasing means including a pair of spirally wound springs, and a plate positioned between said springs and mounted for rotation relative to both spools on the same common axis, one of said springs being operatively interposed to act between said plate and one of said spools, and tending to urge relative rotation therebetween in one direction, and the other spring being operatively interposed to act between said plate and the other spool, and tending to urge relative rotation therebetween in the opposite direction, rotation of said spools between opposite limits of rotation with reverse movement of a tape resulting in tensing and relaxing of said springs in a manner producing greater tension therein with the spools near either extreme of rotation than at intermediate conditions of rotation.

* * * * *